O. BARTLETT.
WHEEL MOISTENING ATTACHMENT.
APPLICATION FILED SEPT. 25, 1917.
1,281,896.
Patented Oct. 15, 1918.
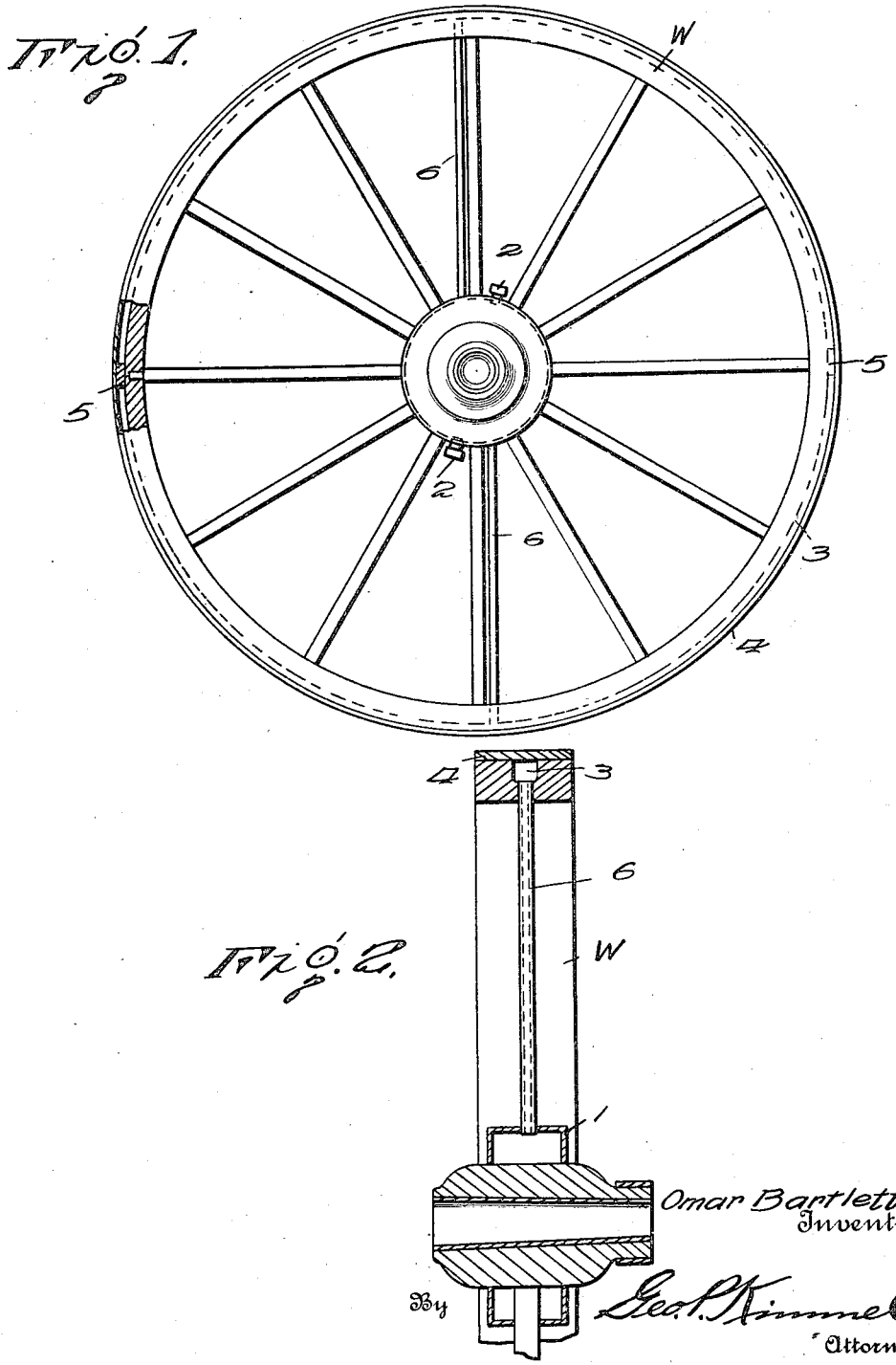

UNITED STATES PATENT OFFICE.

OMAR BARTLETT, OF CULDESAC, IDAHO.

WHEEL-MOISTENING ATTACHMENT.

1,281,896. Specification of Letters Patent. Patented Oct. 15, 1918.

Application filed September 25, 1917. Serial No. 193,175.

*To all whom it may concern:*

Be it known that I, OMAR BARTLETT, a citizen of the United States, and resident of Culdesac, in the county of Nez Perce and State of Idaho, have invented certain new and useful Improvements in Wheel-Moistening Attachments, of which the following is a specification.

This invention relates to wheels and it is the principal object of the invention to provide a novel moistening attachment for wheels, whereby the hubs and fellies thereof will be saturated with oil or other suitable fluid supplied from a local source, thereby toughening the same and adding materially to the durability thereof.

Among other aims and objects of the invention may be recited, the provision of a wheel attachment of the character mentioned with a view to compactness, and in which the number of parts are few, the construction simple, the cost of production small, and efficiency and operation high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings;

Figure 1 is a side elevation of a wheel having the improved attachment applied thereto; and Fig. 2 is a vertical transverse section through a fragment of the wheel.

Having more particular reference to the drawings and in connection with which like reference characters will refer to corresponding parts throughout the several views, W represents the wheel in its entirety, the hub of which has that portion of the same adjacent the spokes provided with a channeled metal band 1, clearly shown in the Fig. 2. It is to be understood, that the band surrounds the wheel hub and is snugly engaged with the same to render a fluid tight reservoir, the purpose of which is hereinafter described. Filling openings are formed in the band 1 at diametrically opposite points and are normally closed by removable caps 2, which caps, if desired, may be screw threaded and turned into engagement with complementally threaded portions formed upon the nipples surrounding the openings in the channeled band 1.

The wheel felly is provided with a peripherally disposed groove or channel 3, the same being closed by the metal tire 4 arranged thereabout, it of course being understood that the tire is snugly engaged with the peripheral surface of the felly, due to the manner in which the same is shrunk thereonto. Cut off blocks 5 are securely arranged in the channel 3 at diametrically opposite points and obviously, serve as means for dividing the said channel.

Outlets or discharge openings are formed in the channeled band 1 and receive the ends of conduits 6, the opposite ends of the said conduits being passed through openings formed in the wheel felly into engagement with the peripherally disposed channel 3 formed therein. Thus, communication between the reservoir constituted by the channeled band 1 and the peripheral channel 3 is established.

The reservoir formed by the band 1 is filled with oil or other suitable fluid by way of the filling openings, and the caps 2 are then applied thereover. The oil contained in the band 1 will now flow through the conduits 6 into the several sections of the peripheral channels 3, thereby permitting the same to seep into the wood, saturating the same, and adding materially to the durability thereof. It will be also appreciated, that a portion of the oil contained by the band 1 will be permitted to seep into the wood of the wheel hub, toughening the same also, and adding to the durability of the same.

As will be readily understood by those skilled in the art, by keeping the wheel constantly moistened or saturated with the oil, the pliable character of the wood is increased, thereby lending to the durability of the construction.

Manifestly, the construction shown is capable of considerable modification and such modification as is within the scope of my claims, I consider within the spirit of my invention.

I claim:

In a wheel, a channeled annular band arranged about a portion of the hub of a wheel communicating therewith, said band having filling openings formed in the same, caps for normally closing said filling openings, the wheel felly having a peripherally disposed channel formed therein, spacing blocks arranged in said channel and at diametrically opposite points, and conduits communicating with the channeled band and channel.

In testimony whereof I affix my signature hereto.

OMAR BARTLETT.

Copies of this patent may be obtained for five cents each, by addressing the "Commissioner of Patents, Washington, D. C."